United States Patent
Wei

(10) Patent No.: US 6,672,380 B2
(45) Date of Patent: Jan. 6, 2004

(54) HEAT SINK BASE PAD

(76) Inventor: Wen-Chen Wei, P.O. Box No. 6-57, Chung-Ho, Taipei 235 (TW)

( * ) Notice: Subject to any disclaimer, the term of this patent is extended or adjusted under 35 U.S.C. 154(b) by 0 days.

(21) Appl. No.: 10/219,348

(22) Filed: Aug. 16, 2002

(65) Prior Publication Data

US 2003/0145983 A1 Aug. 7, 2003

(51) Int. Cl.$^7$ ............................................. F28F 7/00
(52) U.S. Cl. .............. 165/185; 165/80.3; 165/104.33; 361/687; 361/690; 361/700; 361/701; 361/709; 361/710; 257/713; 257/718; 174/15.2; 174/16.3
(58) Field of Search ............... 165/185, 80.3, 165/104.33; 361/687, 690, 700, 701, 709, 710; 257/713, 718; 174/15.2, 16.3

(56) References Cited

U.S. PATENT DOCUMENTS

| | | | | |
|---|---|---|---|---|
| 4,748,495 A | * | 5/1988 | Kucharek ................... 357/82 |
| 5,269,372 A | * | 12/1993 | Chu et al. ................. 165/80.4 |
| 5,285,350 A | * | 2/1994 | Villaume ................... 361/690 |
| 5,680,294 A | * | 10/1997 | Stora et al. ................. 361/695 |
| 5,793,608 A | * | 8/1998 | Winick et al. ............... 361/695 |
| 5,796,578 A | * | 8/1998 | Jones ......................... 361/683 |
| 6,002,584 A | * | 12/1999 | Messmer et al. ........... 361/690 |
| 6,154,362 A | * | 11/2000 | Takahashi et al. .......... 361/695 |
| 6,219,425 B1 | * | 4/2001 | Watanabe .................... 381/152 |
| 6,269,003 B1 | * | 7/2001 | Wen-Chen ................... 361/704 |
| 6,373,696 B1 | * | 4/2002 | Bolognia et al. ............ 361/687 |
| 6,377,456 B1 | * | 4/2002 | Mohi et al. .................. 361/687 |
| 6,392,884 B1 | * | 5/2002 | Chou .......................... 361/687 |
| 6,400,563 B1 | * | 6/2002 | Mohi et al. .................. 361/683 |
| 6,504,711 B2 | * | 1/2003 | Wu et al. .................... 361/687 |
| 6,545,871 B1 | * | 4/2003 | Ramspacher et al. ....... 361/709 |
| 6,574,103 B1 | * | 6/2003 | Hinterlong .................. 361/692 |

* cited by examiner

*Primary Examiner*—Henry Bennett
*Assistant Examiner*—Nihir Patel

(57) ABSTRACT

A heat sink base pad mainly has a heat sink base with a plurality of heat sink holes disposed on the face plate of the base and a heat tube pivotally disposed at the lower end of the face plate thereof to increase the self-heat convection of the bottom portion of the notebook computer placed on the heat sink base and to disperse the heat for quickly dissipating the heat source so as to efficiently reduce the temperature.

4 Claims, 6 Drawing Sheets

HEAT SINK BASE PAD

BACKGROUND OF THE INVENTION

1) Field of the Invention

The present invention relates to a heat sink base pad that is particularly suitable for a notebook computer by disposing a heat sink hole and a hot tube on a heat sink base to form action of heat dissipation and conduction so as to rapidly diffuse heat source for efficiently reducing the temperature.

2) Description of the Prior Art

Accordingly, a heat sink device is usually installed in a common notebook computer mainly by using a heat dissipating fan to blow away the heat energy generated by an electronic element in operation; then the heat energy is sent out through an air outlet to achieve the effect of heat dissipation; however, this kind of heat sink device was not designed ideally because the heat dissipating fan is disposed inside the computer; when in operation, the hot wind blows back and forth inside the computer and that tends to form a stagnant layer; therefore, the hot air can't be blown further; that only consumes the fan power and fails to efficiently increase the effect of heat dissipation and thereby becomes the major factor of causing the breakdown of the heat sink device. In addition, most of the electronic elements, such as the computer central process unit (CPU), the hard disk drive (HDD), the digital video disk (DVD), the electronic integrated chip (IC), the battery or even the fan itself are all capable of generating high temperature during execution; more especially, as the speed of CPU is required to be faster, if the high temperature generated therefrom has not been efficiently conducted outwardly, it might crash the computer or even result in burning the CPU due to overheat, or cause computer breakdown. In order to solve this problem, some of the industrials proposed a heat sink structure mainly having a pad body with three heat dissipating fans disposed thereon; when the notebook computer is placed on top of the pad body for operation, it accelerates the blowing and the dissipation of the heat source generated on the bottom portion of the computer. Although the application of this kind of heat sink pad is capable of increasing the efficiency of heat dissipation, the fan makes noises during rotation, increases the electricity consumption and requires power cords and plug sockets for fitting power sources of different regulations and that is very inconvenient. Therefore, how to efficiently increase the heat sink efficiency has become the critical issue for the industrial to deliberate for improvement.

SUMMARY OF THE INVENTION

Specifically, the present invention mainly has a plurality of heat sink holes disposed on a face board of a heat sink base for increasing free convention; a hot tube is affixed to the bottom of the face board of the heat sink base allowing heat energy to be dissipated evenly; in addition, the heat energy is transmitted to the circumferential rim of the heat sink base for fast diffusion to specifically solve the overheat problem of an electronic element and to make its operation more stable and thereby to extend its useful life; furthermore, the present invention doesn't use any energy source nor electric source and that eliminates the problem in term of regulations; therefore, the present invention is suitable to be extensively applied to various notebook computers; additionally, the assembly design is of retaining style for convenience concern.

Therefore, the primary objective of the present invention is to efficiently reduce the internal temperature of the notebook computer to make the operation thereof more stable.

The secondary objective of the present invention is to efficiently reduce the temperature of the heat generating electronic element of a computer so as to achieve the best effect of heat dissipation thereby to extend its useful life.

Another objective of the present invention is to provide a heat sink pad requiring no energy source but capable of efficiently increasing the effect of heat dissipation.

Yet another objective of the present invention is to provide a heat sink pad not requiring electric power cord, having no problem of regulation but suitable to be applies to all kinds of notebook computers.

Still another objective of the present invention is to provide a heat sink pad easy for assembly through the way of retaining for fast accomplishing assembly and fastening.

To enable a further understanding of the abovementioned objectives, the technical contents and structural features of the present invention, the brief description of the drawings below is followed by the detailed description of the preferred embodiment.

DETAILED DESCRIPTION OF THE PREFERRED EMBODIMENTS

Figure 1:
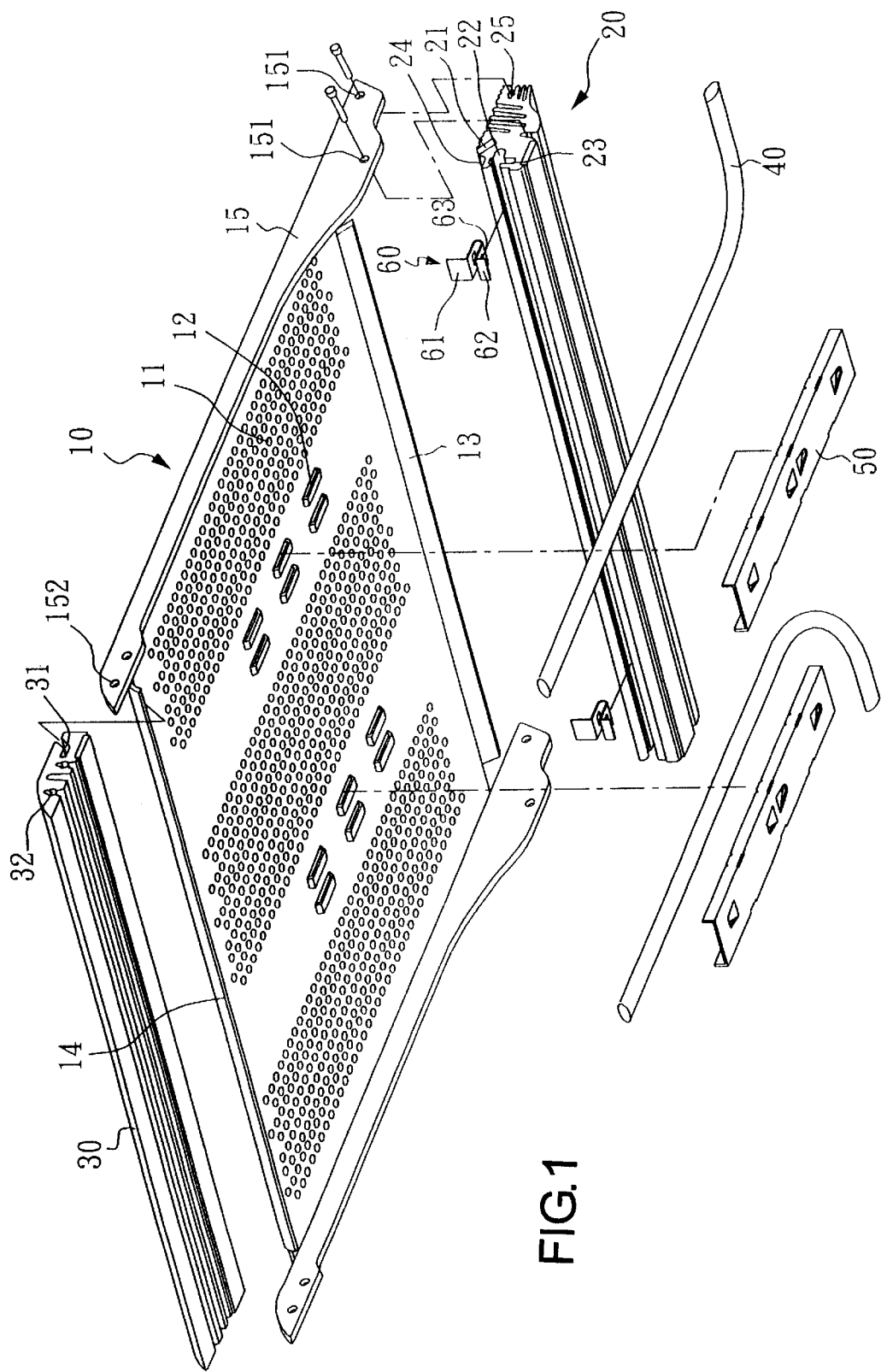
FIG. 1 is an exploded drawing of the present invention.

Referring to FIG. 1, the exploded drawing of the present invention, the present invention comprises a heat sink base (10), a front base board (20), a rear base board (30), a hot tube (40), a positioning clamp (50) and a retaining tab (60), wherein a plurality of heat sink holes (11) are disposed on the face board of the said heat sink base (10) to allow the heat energy to be dissipated through the heat sink holes (11); at a proper area of the face board, retaining holes (12) are formed downwardly and recessively to be arranged in parallel; the said retaining holes (12) are provided for the positioning clamp to retain and clip; at the front end of the heat sink base (10), a front insert piece (13) is disposed to incline downwardly at a certain angle and a rear insert piece (14) is disposed at the rear end thereof and inclines downwardly at a certain angle; both of them are inserted respectively into the front base board (20) and the rear base board (30) for assembly; lateral frames (15) are disposed on two lateral sides thereof; the said lateral frames (15) are disposed at different heights corresponding to the front insert piece (13) and the rear insert piece (14) to raise the heat sink base (10) up to define a space between the face board and the desktop; that purpose is to form a better heat dissipating space between the heat sink base (10) and the desktop as well as at the mean time, to facilitate the placement and operation of the notebook computer.

The said front base board (20) is a base body of a long board to be assembled with the heat sink base (10) and pivotally jointed at the front end of the heat sink base (10); its top plane is disposed with a front base insert groove (21)

at an inclined angle for inserting and assembling the front insert piece (13); the rear side of the said front base board (20) is disposed with a cut groove (22) provided for inserting and hooking the retaining tab (60) thereby to fasten the hot tube (40); the upper and lower areas on the plane vertical to the cut groove (22) are disposed with scoop channels (23) provided for reversely retaining inversed hooks (61); a cut angle (24) is formed between the front base insert groove (21) and the cut groove (22) to fitly receive the hot tube (40); furthermore, two sides of the front base board (20) are disposed with screw fastening holes (25) to be fixedly locked with the lateral frames (15) by means of screw rods.

The said rear base board (30) is a base body of a long board to be pivotally jointed at the rear end of the heat sink base (10); the top plane thereof is disposed with a rear base insert groove (31) at an inclined angle for the inserting and assembling the rear insert piece (14); two sides thereof are disposed with screw fastening holes (32) to be fixedly locked with the lateral frames (15) by means of screw rods.

The said hot tube (40) is a metal hot tube with capillary structure disposed on the inner lateral tube wall for evenly transmitting a great amount of heat energy; after being pressed flatly, it is affixed to the bottom plane of the heat sink base (10) by means of heat conducting sticker; the tube body thereof is clamped between the retaining holes (12) arranged in parallel; one end thereof extends to be embedded at the area of the cut angle (24) disposed recessively on the front base board (20) to enable the heat sink base (10) to evenly conduct and diffuse the heat energy absorbed on the bottom portion of the notebook computer through the hot tube (40).

The said positioning clamp (50) clamps the retaining holes (12) for fastening the hot tube (40) and a press-against portion (51) is disposed on the inner plane thereof; the press-against portion (51) fitly presses against the hot tube (40); the two lateral sides thereof are disposed with retaining hooks (52) corresponding to retaining holes (12) for retaining and fastening with the retaining holes (12).

The said retaining tab (60) is an U-shaped body with the top plane thereof extending to form an upper stopping tab (61) and a lower stopping tab (62); the two lateral sides thereof extend outwardly for disposing an inversed hook (63); when the bottom end of the retaining tab (60) inserts into the cut groove (22), the inversed hook (63) reversely retains with the scoop channel (23) for fastening; at the mean time, the lower stopping tab (62) presses against the front base board (20) while the upper stopping tab (61) presses against the hot tube (40) for preventing loosening.

Figure 2:
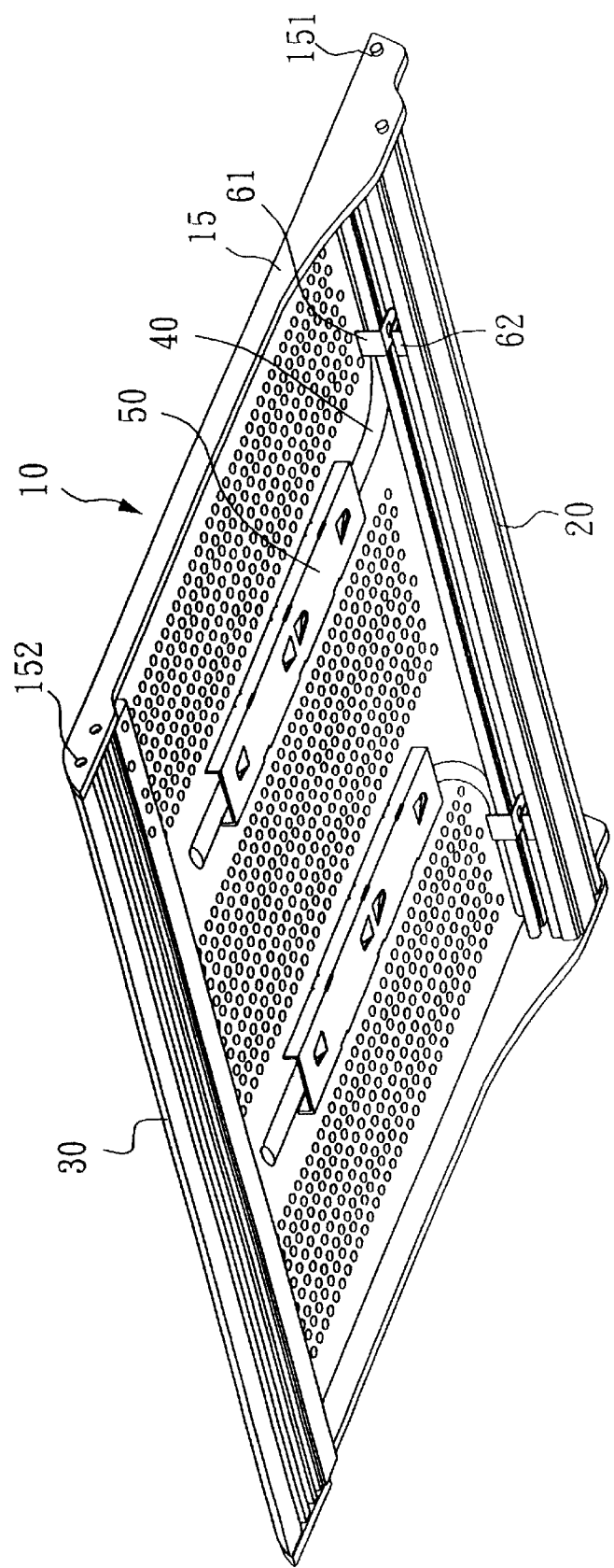
FIG. 2 is a drawing of an assembly of the present invention.
Figure 3:
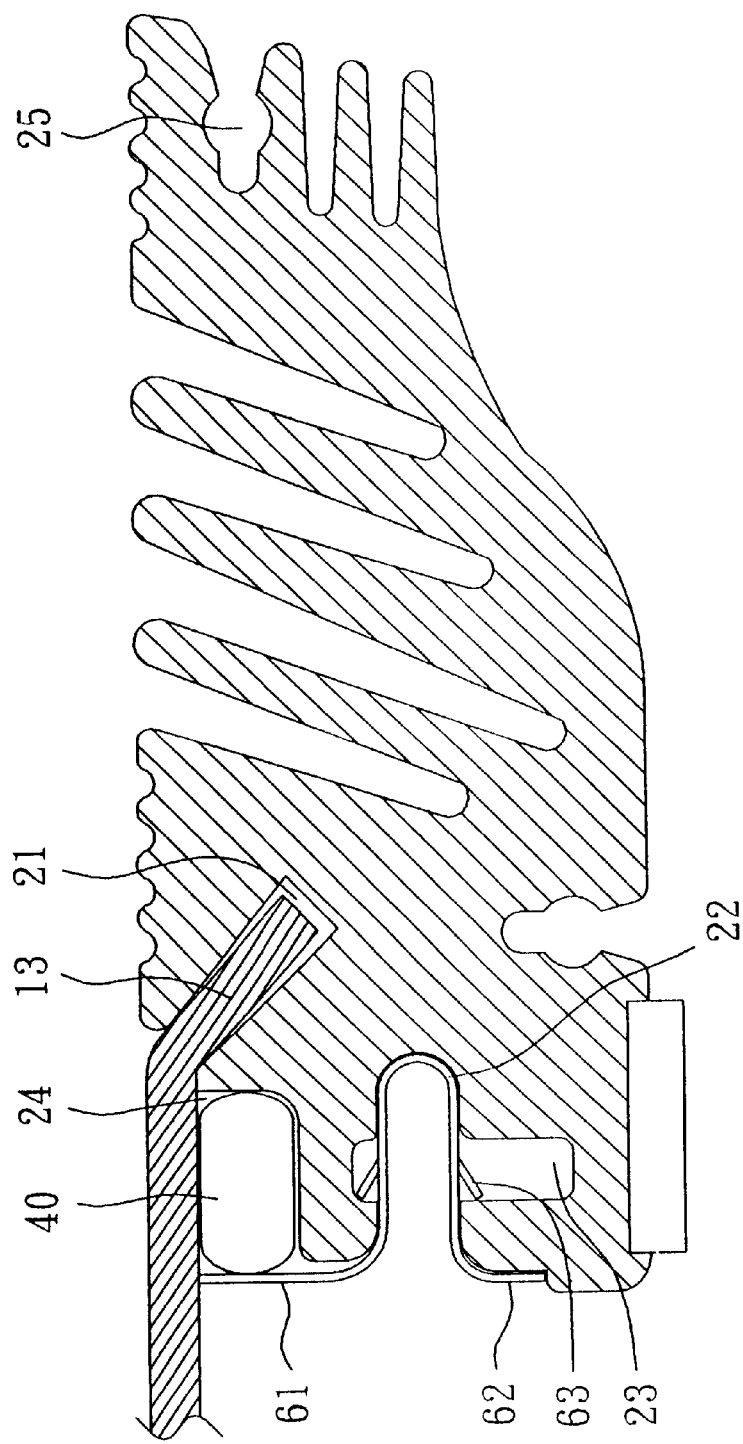
FIG. 3 is a schematic drawing of a partial cross-section of the present invention.
Figure 4:
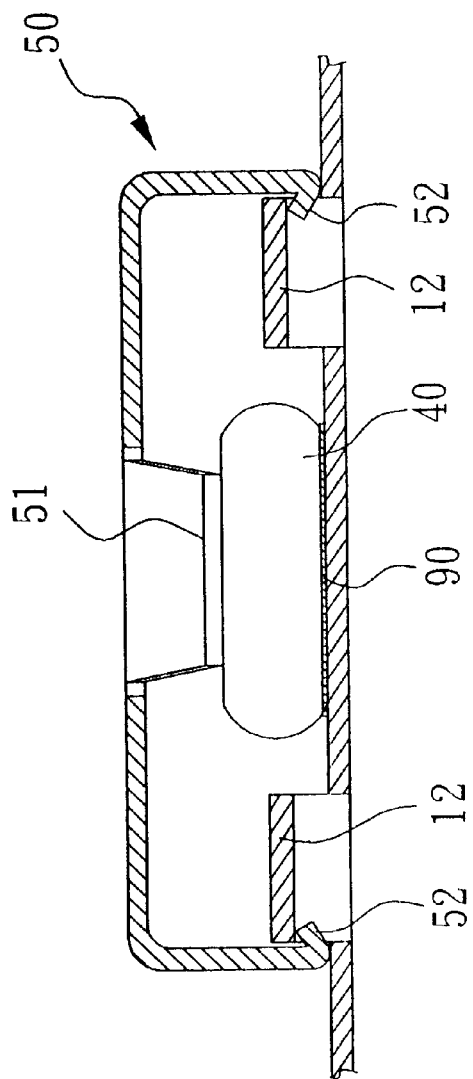
FIG. 4 is a schematic drawing of another partial cross-section of the present invention.

Referring to FIGS. 2, 3 and 4, the drawing of the assembly and the schematic drawings of partial cross-sections of the present invention; when in assembling, sequentially, the front insert piece (13) of the heat sink base (10) inserts into the front base insert groove (21) and the rear insert piece (14) inserts into the rear base insert groove (31); then the screw holes (151, 152), the screw fastening hole (25) of the front base board (20) and the screw fastening hole (32) of the rear base board (30) are respectively threaded for assembly from two ends of the lateral frames (15) by means of screw rods; then on the reverse plane of the heat sink base (10), the hot tube (40) vertically penetrates between the retaining holes (12) arranged in parallel to make one end thereof press against the cut angle (24) of the front base board (20); at the mean time, the retaining hook (52) on one side of the positioning clamp (50) retains with the retaining hole (12), then the other side thereof also retains to form double clamp; therefore, the press-against portion (51) on the inner plane of the positioning clamp (50) synchronously presses against the hot tube (40) for fastening; finally, the retaining tab (60) inserts to plug into the cut groove (22) to make the inversed hook (61) reversely retains with the scoop channel (23) for fastening; at the same time, the upper stopping tab (61) presses against the hot tube (40) so as to accomplish the assembly of the present invention.

Figure 5:
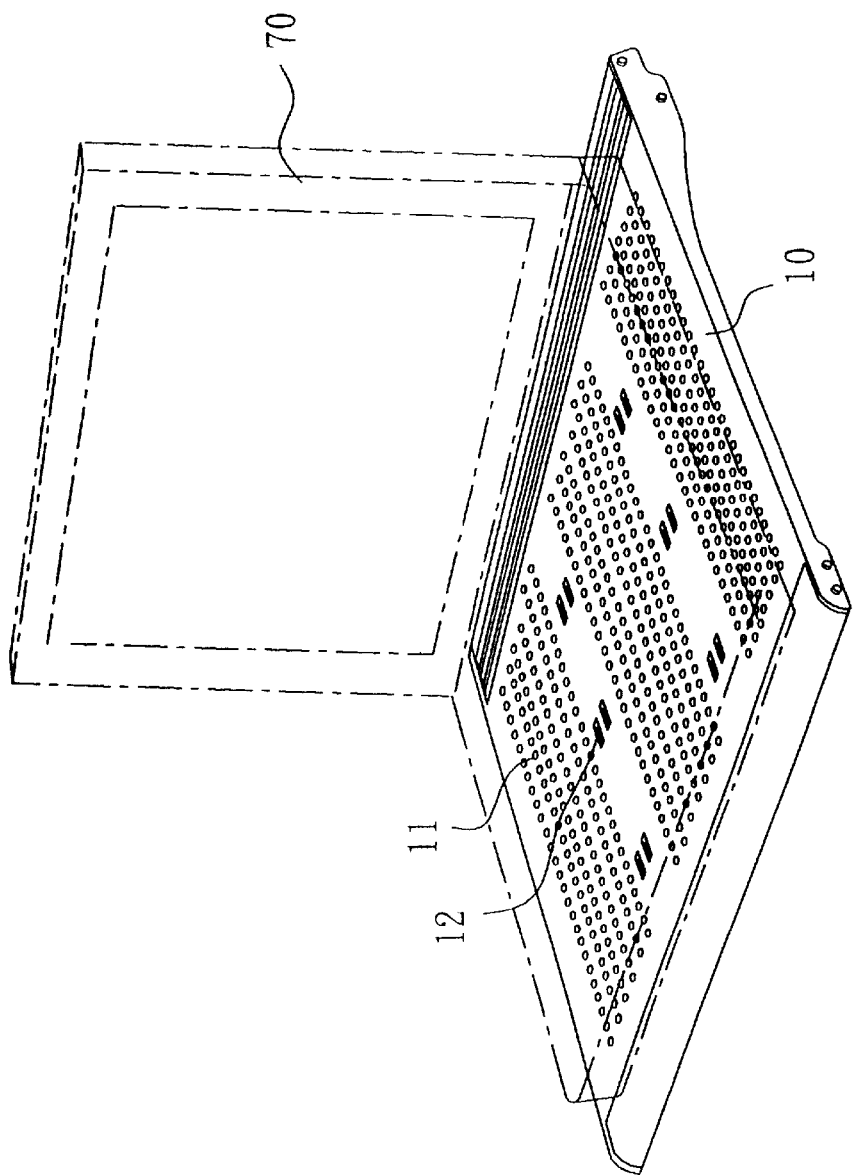
FIG. 5 is a schematic drawing of an application of the present invention.

Referring to FIG. 5, the schematic drawing of the application of the present invention, when the notebook computer (70) continuously operates to cause the bottom portion thereof generate heat energy, the heat energy is contacted and absorbed by the heat sink base (10); the ventilating design of the heat sink holes (11) increases the dissipation of the downward convection to form the first layer of heat dissipating function for avoiding excessively high temperature; furthermore, through directly contacting the heat energy, the heat sink base (10) transmits the absorbed heat energy downwardly to the hot tube (40) affixed below the face board to allow the heat energy to be evenly and quickly conducted and diffused through the hot tube (40) by way of radiation toward the circumference of the heat sink base (10); it further allows the heat energy to flow more smoothly without stagnation so as to continuously and rapidly diffuse the heat energy outwardly and at the mean time, to rapdily dissipate the heat absorbed on the bottom portion of the notebook computer (70) to fully achieve the effect of heat dissipation.

Figure 6:
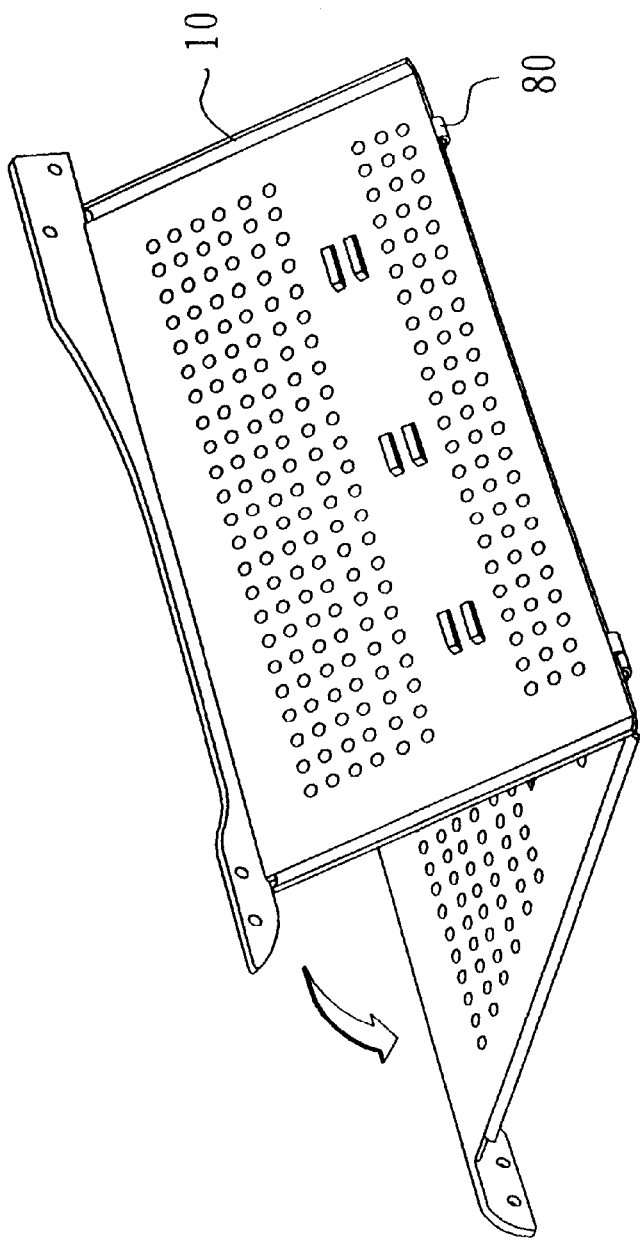
FIG. 6 is a schematic drawing of another embodiment of the present invention.

Referring to FIG. 6, the schematic drawing of another embodiment of the present invention, the heat sink base (10) of the present invention can be of a foldable design for convenient carrying; it is only necessary to make a cut at a proper area on the heat sink base (10) for disposing a pair of male and female retainers (80) for assembling two members in superposition so as to reduce the volume.

What worthy of mention is that the heat sink base (10) of the present invention can be unitarily punch-molded with the front base board (20) and the rear base board (30); when in assembly, it is only necessary to hook and retain the positioning clamp (50) and the retaining hole (12) for pressing against and fastening the hot tube (40); then the retaining tab (60) inserts into the cut groove (22) to make the upper stopping tab (61) press against the hot tube (40) thereby to accomplish the retaining and assembly for further increasing the speed of mass production.

In summation of the abovementioned, the present invention of a heat sink pad is a reasonable and complete invention with excellent practicality and innovation in terms of the design of structural space and is capable of obviously increasing the speed of heat dissipation to specifically enhance the effect of heat dissipation.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A heat sink base pad mainly comprises:
   a heat sink base with a plurality of heat sink holes disposed on the face board thereof; retaining holes are formed downwardly and recessively at a proper area of the face board; a front insert piece and a rear insert piece inclining downwardly at a certain angle are respectively disposed at the front and rear ends; a lateral frame is disposed on two sides thereof with the front portion higher than the rear portion to define a space between the heat sink base and the desktop for heat dissipating flow;

a front base board is a base body of a long board with its top plane disposed with a front base insert groove at an inclined angle for inserting and assembling the front insert piece; the rear side thereof is disposed with a cut groove provided for inserting and hooking a retaining tab so as to fasten the hot tube;

a rear base board is a base body of a long board with the top plane thereof disposed with a rear base insert groove at an inclined angle for the inserting and assembling the rear insert piece;

two hot tubes are pressed flatly and affixed to the bottom plane of the heat sink base by means of heat conducting sticker;

two positioning clamps with a press-against portion disposed on the inner plane thereof for pressing against the hot tube; two lateral sides thereof corresponding to the retaining holes are disposed with retaining hooks for retaining and fastening with the retaining holes;

two retaining tabs are in U-shaped bodies with the top planes thereof extending to form an upper stopping tab and a lower stopping tab; two lateral sides thereof extend outwardly for disposing an inversed hook.

2. The heat sink pad according to claim 1, wherein on the front base board, the upper and lower areas on the plane vertical to the cut groove are disposed with scoop channels provided for reversely retaining inversed hooks.

3. The heat sink pad according to claim 1, wherein a cut angle is formed between the front base insert groove of the front base board and the cut groove of the front base board to define a space for receiving the hot tube.

4. The heat sink pad according to claim 1, wherein the said heat sink base, the front base board and the rear base board can be unitarily punch-molded.

* * * * *